Sept. 10, 1963       M. L. QUIN       3,103,157
LIGHTING AND AIR CONDUCTING APPARATUS
Filed Nov. 6, 1961                    4 Sheets-Sheet 1
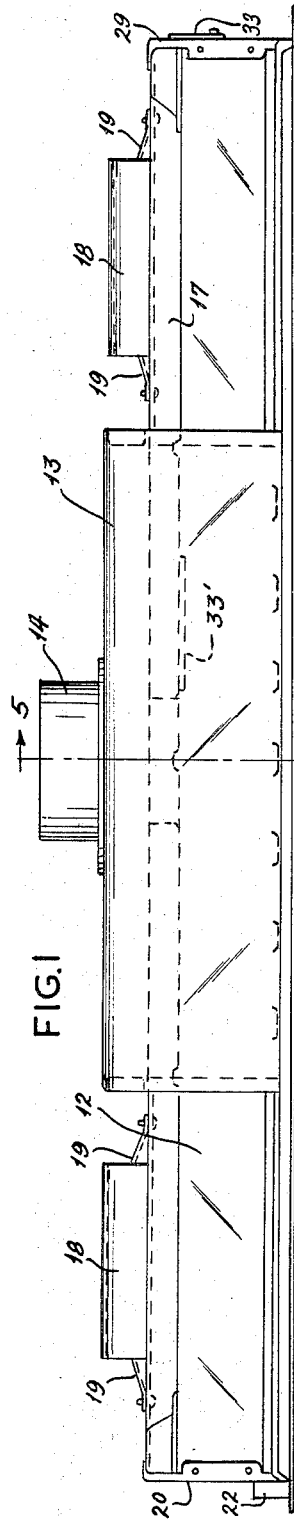
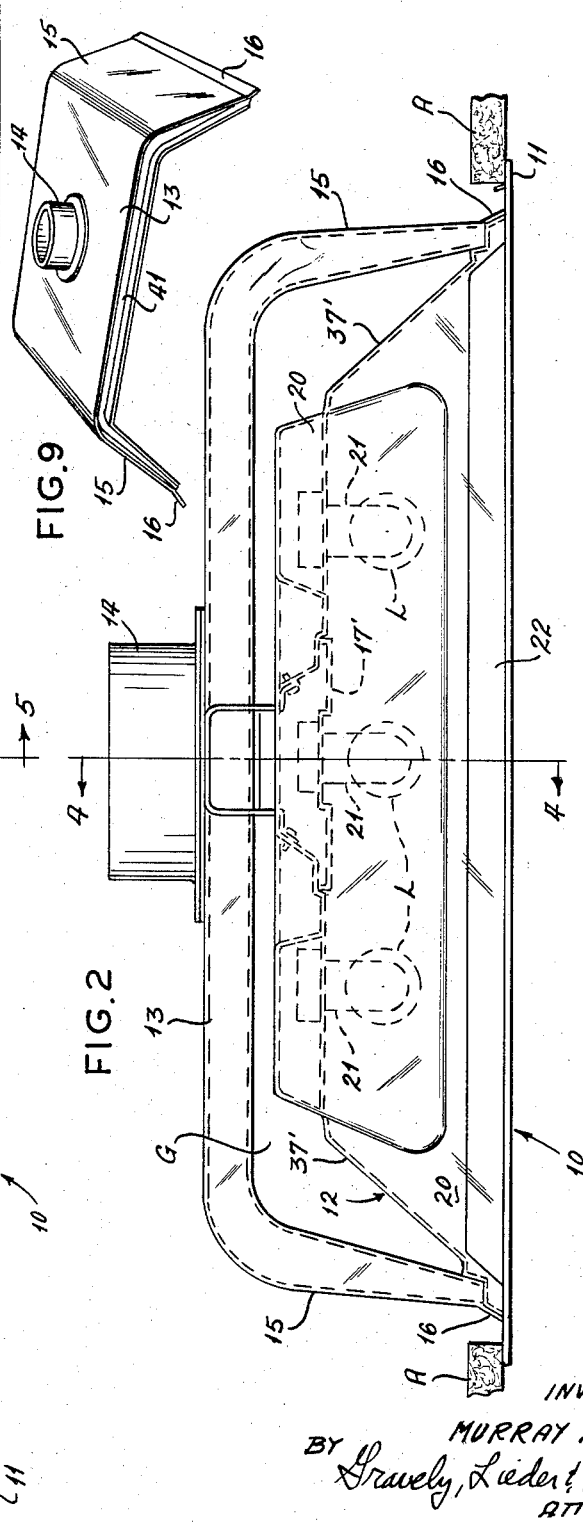
INVENTOR:
MURRAY L. QUIN
BY Gravely, Lieder & Woodruff
ATTORNEYS Sept. 10, 1963  M. L. QUIN  3,103,157
LIGHTING AND AIR CONDUCTING APPARATUS
Filed Nov. 6, 1961  4 Sheets-Sheet 2
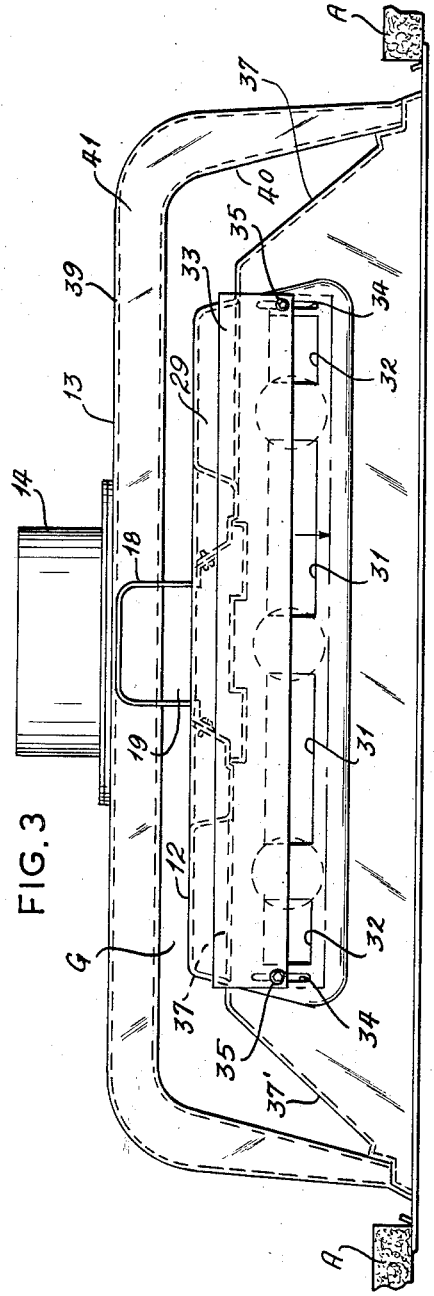
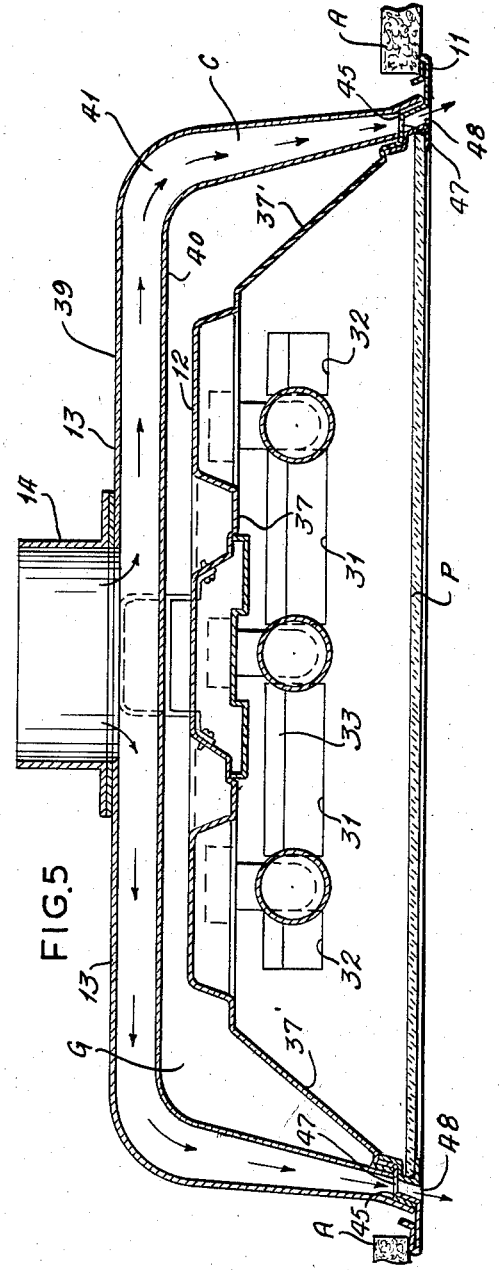
INVENTOR:
MURRAY L. QUIN
By Gravely, Lieder & Woodruff
ATTORNEYS

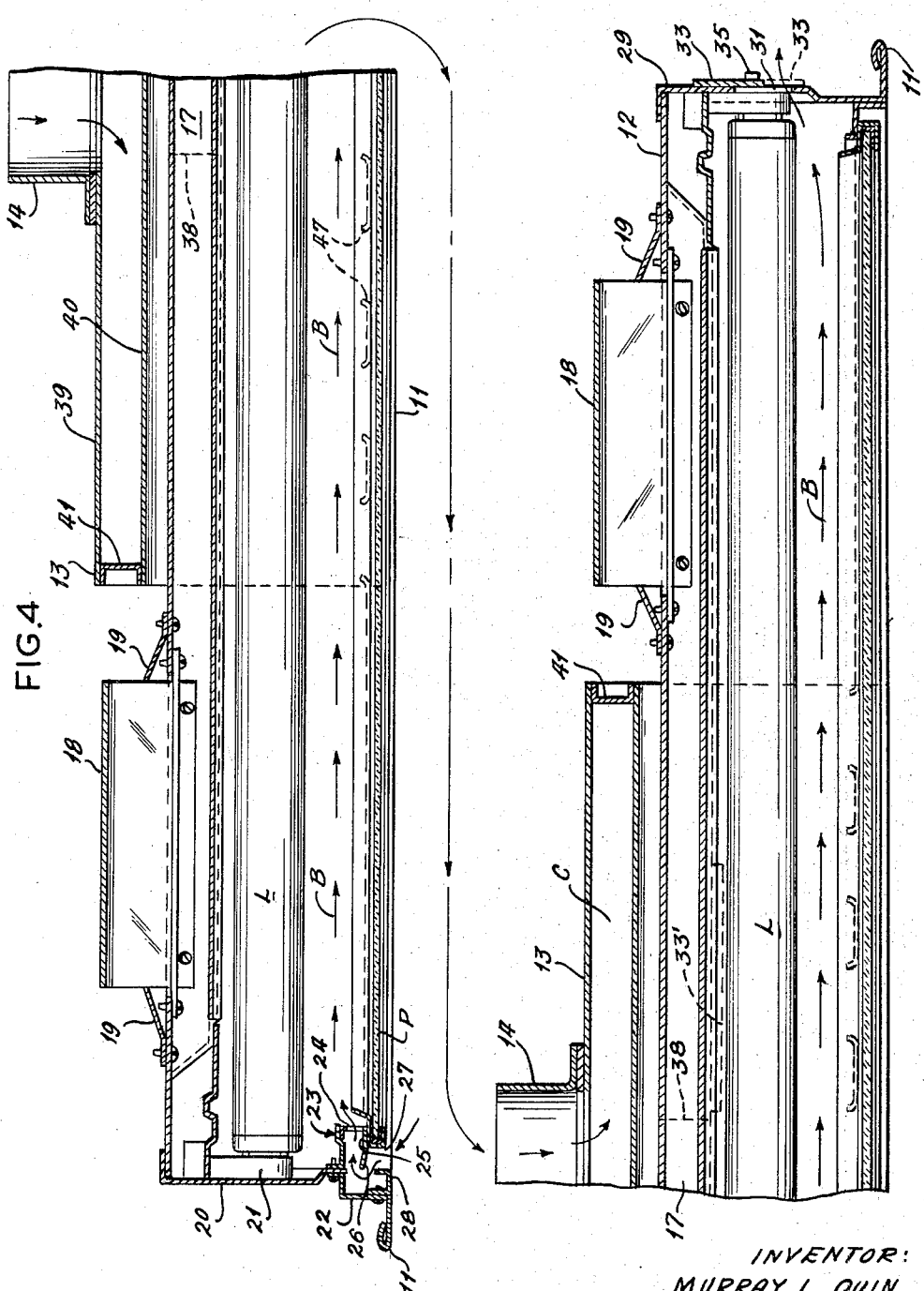

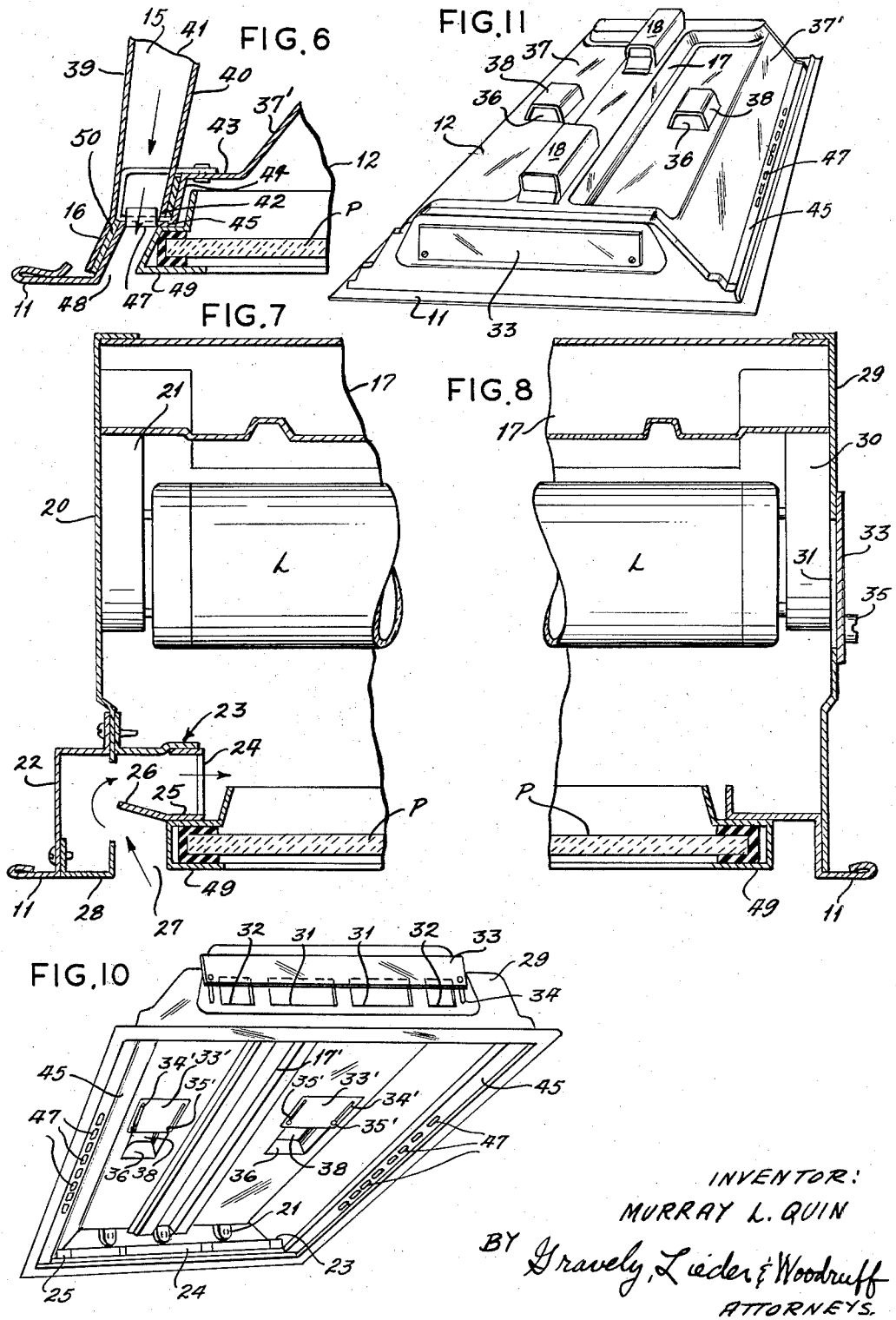

United States Patent Office 3,103,157
Patented Sept. 10, 1963

3,103,157
LIGHTING AND AIR CONDUCTING
APPARATUS
Murray L. Quin, Overland, Mo., assignor, by mesne assignments, to The Emerson Electric Manufacturing Company, St. Louis County, Mo., a corporation of Missouri
Filed Nov. 6, 1961, Ser. No. 150,420
4 Claims. (Cl. 98—40)

This invention relates to apparatus for illuminating buildings and conducting ventilating or conditioned air into and out of the buildings, and is particularly concerned with certain novel features adapting lighting apparatus to the dual functions enumerated.

It is an important object of this invention to adapt a lighting fixture to the handling of air movement into and out of a building so that the lighting efficiency is substantially unimpaired and adequate volumes of air may be handled effectively.

It is another important object of this invention to provide a lighting fixture with air moving provisions arranged to utilize air as an insulating medium so that the lighting heat and the thermal condition of the air are not adversely affected to the detriment of the illumination requirements or temperature of the air.

A preferred embodiment of this invention comprises a lighting fixture having a lamp space with a transparent lens exposed to the space to be lighted, an air conducting body for the fixture arranged in spaced relation but utilizing portions of the fixture to deliver air to the building space, and means on the fixture forming a separate air conducting passage in combination with the lamp space such that air in the building space may be exhausted. The invention also comprises the features, components and parts of the apparatus chosen for this disclosure and more particularly described herein.

The foregoing objects of this invention will become apparent during the course of the description relating to the embodiment illustrated in the accompanying drawings, wherein:

FIG. 1 is a longitudinal elevational view of lighting apparatus constructed according to the principles of this invention;

FIG. 2 is an enlarged end elevational view of the apparatus seen from the left end in FIG. 1;

FIG. 3 is an enlarged end elevational view of the apparatus seen from the right end in FIG. 1;

FIG. 4 is an enlarged longitudinal sectional elevational view taken at line 4—4 in FIG. 2 with the view being divided into two parts for better disclosure of the structure;

FIG. 5 is an enlarged sectional elevational view seen at line 5—5 in FIG. 1;

FIG. 6 is an enlarged and fragmentary sectional view of a typical connection of the air conducting means with the lighting fixture;

FIG. 7 is a greatly enlarged and fragmentary sectional elevational view of the left end of the apparatus shown in FIG. 4;

FIG. 8 is a greatly enlarged and fragmentary sectional elevational view of the right end of the apparatus shown in FIG. 4;

FIG. 9 is a perspective view of the air conducting body shown in section in FIG. 5;

FIG. 10 is a perspective view of the lighting fixture seen from below with the lens removed and the air conductive body also removed; and FIG. 11 is a perspective view of the lighting fixture seen from the top with the air conducting body removed.

A preferred form of the present invention has been shown in FIG. 1, and details thereof appear in other views of the accompanying drawings which will be referred to during the course of the following description. The apparatus of FIG. 1 comprises a lighting fixture 10 adapted to be received in a ceiling or wall and located by face flange 11 such that the body structure 12 of the fixture is within the usual space behind the wall or ceiling. The body 12 supports a ventilating or conditioned inlet duct shown generally at 13, and shown more particularly in perspective in FIG. 9. The inlet duct is provided with an inlet connection adaptor 14, and such duct is formed with laterally and angularly extending legs 15 which are provided with slot-like outlet openings adjacent and marginal flanges 16. Comparing FIGS. 1 and 11, the fixture body 12 is provided with a longitudinally extending wire way 17, and the wire way carries on the outside suitable enclosures 18 for the usual transformers utilized with fluorescent lamps. Each transformer enclosure is provided at its respective ends with a wire shield 19 to protect the necessary wire leads which run from the transformers into the wire way 17. As may be seen in FIGS. 2 and 10 the wire ways 17 is closed at the interior of the body structure by a closure panel 17'.

The general assembly and disposition of parts of the apparatus shown in FIG. 1 is more particularly disclosed in FIGS. 2 through 5, and certain details are shown on an enlarged scale in FIGS. 6, 7 and 8. First with reference to FIGS. 2 and 4, it will be observed that the lighting fixture body 12 is provided with an end cap 20 closing a substantial portion of the upper part of the body 12, and particularly enclosing the usual sockets 21 for the fluorescent lamps L. The lower portion of the end cap 20 forms part of an air inlet box which is arranged to prevent the outward leakage of light. The air inlet and light leakage preventing box of FIGS. 4 and 7 is composed of an outer enclosing wall 22 and an inner wall structure 23 including a portion formed with apertures 24 opening to the interior of the fixture where the lamps are disposed. The inner wall structure 23 includes a wall member 25 which provides a seat across the end of the fixture for the usual lens panel P. The wall 25 is provided with an extension 26 which projects into the passage way of the air inlet box so as to completely block the escape of light without substantial interference with the air flow. The air inlet for the box is at 27 and is in the form of a slot extending transversely of the fixture between the member 25 and an angular edge 28 on the outer wall 22. The foregoing details of construction are shown to greater advantage in FIG. 7 and like reference numerals will appear in such drawing. The outer wall 22 is formed with a portion which constitutes a part of the face flange 11.

The opposite end of the lighting fixture 10 (FIGS. 3, 4 and 8) includes an end cap 29 enclosing the end of the body 12 and more particularly enclosing the lamp sockets 30. Such cap 29 also has a portion which constitutes a part of the face flange 11.

The end cap 29 is provided with a series of apertures (FIG. 3) in its end wall such as the elongated intermediate apertures 31 and the smaller side apertures 32. The series of apertures 31 and 32 are adapted to be controlled by a damper plate 33 which is adjusted in the direction of the slots 34 by suitable clamp elements 35. Therefore, the damper plate 33 may be raised as shown in FIG. 3 to expose the apertures 31 and 32 or it may be lowered to the dotted outline position shown in FIG. 4. The apertures 31 and 32 provide communication between the lamp space within the fixture 10 and the exterior space located above the ceiling or wall which is represented at A in FIGS. 2, 3 and 5. Since the opposite end of the fixture adjacent the end cap 20 is provided with an air inlet box it can be appreciated that air from the space to be illuminated on one side of the wall or ceiling A is placed in communication from the opposite side through the lamp chamber. This is depicted by the arrows B in FIG. 4.

Alternate to the foregoing air flow passage from the inlet 27 for the air box at end cap 20 to the outlet apertures 31 and 32 in the end cap 29, a fixture similar to fixture 10 may be provided with air outlets 36 in the top wall 37. The alternate air outlet 36 is best seen in FIGS. 10 and 11 in the form of arched or upwardly struck wall portions 38 which are open at one or both ends (the disclosure is of openings at both ends) such that the air flow from within the fixture through the apertures 36 will be directed toward one or both ends of the fixture. The wall portions 38 provide continuity of the interior reflective surface of the fixture body and thereby make it possible to avoid having dark spots or shadows created when viewing the enclosing lens panel P with adjustable dampers 33' open as shown in FIG. 10. The dampers 33' are adjustable in the direction of the slots 34' by suitable clamp elements 35'. It is understood, of course, that the air outlets 36 with adjustable damper 33' or their equivalent may or may not be combined with the adjustable damper 33 and apertures 31 and 32. Furthermore, it is understood that the outlets 36 may be employed entirely alone and the damper 33 and apertures 31 and 32 may be eliminated and replaced, if desired, by a similar inlet box to that shown at 22 for the end cap 20. With this in view, it will not be necessary to depict a separate fixture body in the drawings.

Turning now to FIGS. 4, 5, 6 and 9 it can be appreciated that the inlet duct 13 is made up of an outer wall 39 and an inner wall 40 held in spaced relation by channel closure 41. Each channel closure 41 is in the form of an arch, as more particularly shown in FIG. 9, to provide a relatively straight center section and two depending leg portions 15 so as to continuously connect the outer and inner walls 39 and 40 at their respective opposite margins. The outer wall 39 supports the usual inlet connection adaptor 14, and the opposite margins of this wall at the extremities of the leg portions 15 provide the marginal flanges 16 (see FIG. 6).

It will be observed that the arched configuration of the channel closures 41 is such that the inlet duct 13 is disposed in spaced relation above the top wall 37 of the fixture body 12 and outwardly of the opposed slanting side walls 37' thereof. This space forms an air gap G to insulate the duct 13 from the fixture body 12. Each of the slanting walls 37' terminates in a stepped flange having a horizontal portion 43, a depending portion 44 and a further horizontal portion 45 which terminates in a suitable depending marginal flange shown generally at 46. The portion 46 terminates in the marginal face flange 11. A part of the stepped flange, and more particularly the horizontal portion 45 thereof, is suitably lanced or otherwise punched to form a series of slots 47. This structure is found in both side flanges of the fixture body as is shown in FIGS. 5 and 10. The slots 47 therefore open between the inner chamber C of duct 13 and elongated apertures 48 which are provided by the spacing between the marginal flange 46 at each side of the body and the inwardly spaced but adjacent frame 49 for the panel P. A suitable gasket or other seal 50 is provided along the cover flanges 16 and at the respective lower ends of the channel closures 41 so that air leakage will be substantially prevented and the flow of air will take place through the chamber C and through slots 47, apertures 48, and into the building space.

The foregoing description relates to a preferred embodiment of the invention in which a lighting fixture 10 is combined with a ventilating or air inlet duct 13 so that ventilating or conditioned air may be introduced through suitable slots and marginal apertures 47 and 48 in two opposite margins of the body 12 of the fixture 10 to the space being illuminated thereby. It is observed that the inlet duct 13 is physically spaced from the fixture 10 so that a gap G is formed therebetween, whereby in the case of cooled or conditioned air the cooling effect will not be transferred to any part of the fixture housing close to the lamps which could, in turn, cool the lamps L and thereby decrease the lamp efficiency. The inlet duct 13 is particularly suitable to achieve the foregoing result in that it is in limited physical contact with the stepped flange portions 44, 45 and 46 of the general flanges 43 on the slopping side walls 37' which are quite remote from the lamps L. In addition, the fixture 10 embodies the further improvement in that it forms a conduit or passage through which air may be exhausted from the space being illuminated. The exhaust air is usually considerably warmer than the ventilating or inlet cooled air and is inducted to the fixture 10 at the opposite transverse ends of the fixture in spaced relation relative to the outlet slots 47 which communicate with the elongated narrow passages 48. Since the exhaust air is usually warm it does not impose any serious cooling effect on the lamps L, but on the contrary it creates air movement within the lamp space which heretofore has been merely a stagnant body of air in which a considerable amount of heat accumulates. Therefore, the creation of an air flow or movement within the lamp space permits a reduction in the usual heat buildup which has an efficiency decreasing effect on the lamps as does cooling. There is, therefore, the advantage in a fixture of this character of means providing for exhausting air from the space being illuminated through the lamp space and to some exterior point of discharge.

As has been pointed out, the air flow within the lamp space may take place, as shown by arrows B in FIG. 4, between the air inlet 27 adjacent the end cap 20 and the apertures 31 and 32 in the end cap 29. It has also been pointed out that the damper 33 and apertures 31 and 32 may be closed off (or eliminated if desired) and the exhaust air will move out of the lamp space through the air outlets 36 formed by the walls 38 in the top wall 37 of the fixture 10. In such instance dampers 33' will control air outlets 36. It may not be necessary to utilize both the apertures 31 and 32 with the outlets 36, and if apertures 31 and 32 are to be relied upon, then the outlets 36 and dampers 33' may not be provided. Both provisions, however, are shown in FIGS. 10 and 11 for convenience of illustration.

The foregoing description of a preferred embodiment is intended to include all changes and modifications of structure which will satisfy the objectives of the invention and which do not constitute departures from the spirit and scope of the invention.

What is claimed is:

1. A fixture for lighting and ventilating a room space through a wall having an opening from the room to an exterior area, said fixture comprising: a body shell having a top wall, opposite side walls and end walls connected together to form a cavity with an open light emitting side, at least said side walls having flanges extending laterally outwardly substantially in the plane of the open side to locate said body shell relative to the wall opening with the open side facing the room space and said top, side and end walls being substantially located in the exterior area; illuminating lamp means in said cavity; an air inlet and light trap box on said fixture adjacent said one end wall of said body shell, said box comprising a wall portion on said one end wall extending transversely of said body shell at the wall opening from the room, an inner wall projecting inwardly from said wall portion and extending transversely of said body shell, said inner wall having an air flow aperture therein and an extension adjacent said air flow aperture providing an obstruction to the passage of light from said cavity to the room, the air flow aperture in said inner wall being spaced from said wall portion to form a passage for room air flow into said cavity adjacent said inner wall extension; transparent panel means for the open light emitting side of said body shell, said panel means having opposed side margins spaced inwardly from said side wall flanges to provide side spaces therebetween and one end margin of said panel means being spaced inwardly from said one end wall portion of the body shell and abutting said inner wall to close off air flow to the cavity around said one end margin; and a ventilating air supply duct in the exterior area over said body shell in spaced relation with said side walls of the body shell, said duct being formed of upper and lower walls and side closure walls extending downwardly at each side wall of said body shell and terminating in abutment on said body shell over said laterally outwardly extending flanges, said last mentioned flanges having apertures therein enclosed by said duct walls and open to the room at said side spaces, and said duct having an air supply inlet; and said body shell having an air outlet to the exterior area to exhaust lamp heated room air entering at said air inlet box.

2. A fixture for lighting and ventilating a room space through a wall having an opening from the room to an exterior area, said fixture comprising: a body structure having a top wall, opposite side walls and end walls connected together to form a cavity with an open light emitting side, at least said side walls having flanges extending laterally outwardly from the open light emitting side and serving to locate said body structure relative to the wall opening; an air flow passage defining assembly carried by said body structure adjacent to and including a portion of one end wall, said assembly including an apertured wall disposed inwardly of and adjacent said end wall portion and extending transversely between the opposite side walls adjacent the open light emitting side, said apertured wall having a portion thereof spaced from said end wall portion to form an entrance for the air flow passage opening to the cavity in said body structure from said room space; said body structure having an air outlet opening spaced from said passage defining assembly and open to the exterior area from said cavity: illuminating lamp means in said cavity; light pervious closure means disposed over the open light emitting side of said body structure, said closure means having side margins spaced inwardly from said laterally extending body side wall flanges; and a ventilating air supply duct in the exterior area over said body structure and in spaced relation with said side walls of the body shell, said duct having spaced apart inner and outer walls and other walls extending therebetween to form with said inner and outer walls an air flow passage, said duct walls extending downwardly beside said side walls and providing spaced downwardly directed legs, each leg having a terminal end engaged with a side wall flange from the exterior area and between said end walls, each of said side wall flanges enclosed by said terminal end having an air outlet to the room space, and said duct having a ventilating air inlet spaced from said terminal ends.

3. The fixture set forth in claim 2 wherein said light pervious closure means includes a frame, one end portion of which seats on said transverse apertured wall to close off air and light leakage around said latter wall.

4. The fixture set forth in claim 2 wherein a light obstructing baffle is disposed in the air flow passage assembly, the baffle being carried by the apertured transverse wall, and extending therefrom in a direction such that light from said illuminating lamp means is not directly visible through said air flow passage assembly.

References Cited in the file of this patent
UNITED STATES PATENTS

| | | |
|---|---|---|
| 2,991,708 | Falk | July 11, 1961 |
| 3,010,378 | Geocaris | Nov. 28, 1961 |
| 3,065,686 | Geocaris | Nov. 27, 1962 |